(12) United States Patent
Navarro

(10) Patent No.: US 9,337,690 B2
(45) Date of Patent: May 10, 2016

(54) UPS SYSTEMS AND METHODS USING MODE-DEPENDENT GROUNDING

(71) Applicant: Eaton Corporation, Cleveland, OH (US)

(72) Inventor: George Arthur Navarro, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 707 days.

(21) Appl. No.: 13/661,257

(22) Filed: Oct. 26, 2012

(65) Prior Publication Data

US 2014/0117764 A1    May 1, 2014

(51) Int. Cl.
*H02J 9/00*    (2006.01)
*H02J 9/06*    (2006.01)

(52) U.S. Cl.
CPC ........... *H02J 9/062* (2013.01); *H02J 2009/063* (2013.01)

(58) Field of Classification Search
CPC ............. H02J 9/061; H02J 9/06; H02J 9/062; H02J 4/00; H02J 9/00; H02J 2009/068; H02J 3/383
USPC .......................................................... 307/64
See application file for complete search history.

(56) References Cited

U.S. PATENT DOCUMENTS

| | | | |
|---|---|---|---|
| 4,719,550 A | 1/1988 | Powell et al. | |
| 5,013,929 A * | 5/1991 | Dhyanchand | F02N 11/04 290/31 |
| 5,234,319 A | 8/1993 | Wilder | |
| 6,605,879 B2 * | 8/2003 | Wade | H02J 9/062 307/66 |
| 8,410,638 B2 * | 4/2013 | Johnson, Jr. | H02J 3/26 307/105 |
| 8,415,904 B2 * | 4/2013 | Rippel | H02P 6/14 318/139 |
| 8,730,691 B2 * | 5/2014 | Paatero | H02M 7/487 363/131 |

(Continued)

FOREIGN PATENT DOCUMENTS

DE    195 02 224 C1    2/1996

OTHER PUBLICATIONS

Notification of Transmittal of the International Search Report and the Written Opinion of the International Searching Authority, or the Declaration, PCT/US2013/066743; Date of Mailing: Feb. 24, 2014; 10 pages.

(Continued)

*Primary Examiner* — Jared Fureman
*Assistant Examiner* — Esayas Yeshaw
(74) *Attorney, Agent, or Firm* — Myers Bigel & Sibley, P.A.

(57) ABSTRACT

A UPS system includes an inverter circuit having an input coupled to a DC link and an output configured to be coupled to a load and a gang switch (e.g., a contactor) configured to couple and decouple the DC link to and from a DC power source and to couple and decouple a neutral point of the inverter circuit to and from a ground node. The gang switch may be configured to couple the neutral point to the ground node when the DC link is coupled to the DC power source and to decouple the neutral point from the ground node when the DC link is decoupled from the DC power source.

18 Claims, 5 Drawing Sheets

(56) References Cited

U.S. PATENT DOCUMENTS

| | | | | |
|---|---|---|---|---|
| 2002/0017822 | A1* | 2/2002 | Umemura | H02J 7/345 307/66 |
| 2003/0048006 | A1* | 3/2003 | Shelter, Jr. | H02J 9/061 307/64 |
| 2006/0043793 | A1* | 3/2006 | Hjort | H02J 9/062 307/1 |
| 2008/0111424 | A1* | 5/2008 | Yeh | H02J 7/34 307/65 |
| 2009/0072623 | A1* | 3/2009 | Liao | H02J 9/061 307/65 |
| 2009/0267417 | A1 | 10/2009 | Lee | |
| 2012/0013193 | A1 | 1/2012 | Sato et al. | |
| 2012/0205982 | A1* | 8/2012 | Navarro | H02J 9/061 307/66 |

OTHER PUBLICATIONS

Eaton Corporation; *Power Xpert 9395 UPS* 225-1100 kVA, Product Brochure, pp. 1-12, May 2012.

Rasmussen; *The Role of Isolation Transformers in Data Center UPS Systems*—White Paper 98—Schneider Electric, pp. 1-26, (2011).

* cited by examiner

UPS SYSTEMS AND METHODS USING MODE-DEPENDENT GROUNDING

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities. UPS systems may be used in such installations to provide backup power to maintain operation in event of failure of the primary utility supply. These UPS systems often have an "on-line" configuration including a rectifier and inverter coupled by a DC link that is also coupled to an auxiliary power source, such as a battery, fuel cell or other energy storage device. Other configurations, such as standby and line-interactive configurations, may also be used. UPS systems may have a modular structure including two or more UPS modules, each of which may include, for example, a rectifier, an inverter and a DC/DC converter for interfacing to a battery or other DC power source. The modules commonly are designed to operate in parallel to provide scalable power capacity, e.g., the modules may be coupled in common to an AC source, a DC source (e.g., a battery) and/or a load.

Power quality is generally a concern for electrical power users, particularly those involved with critical power applications, such as data center applications. Data center applications have traditionally used large, transformer-based UPS systems. However, increased energy cost, high real estate cost, and environmental concerns associated with transformer-based designs have motivated the development of transformer-less designs. Differences in the technologies used in transformer-based and transformer-less UPS designs may be of concern in particular applications, such in applications using a 3-wire service.

A conventional transformer-less UPS, such as the Eaton® 9395 Power Xpert™ UPS, may include a boost rectifier configured to be coupled to an AC source and a buck inverter that is coupled to the output of the rectifier by a DC bus and that produces an AC output for a load. This arrangement allows operation without an output transformer. A separate DC/DC converter may be used to connect a battery to the DC bus and to regulate variations in DC voltage from the battery. An additional converter may be used to create a neutral by modulating a zero sequence equal to one-third the sum of the three output phases.

The UPS may fed from a source of supply that is referenced to earth ground, such as a source transformer with a wye secondary with its neutral bonded to earth ground. Because the UPS output shares the same plane of reference as the input source, grounding of the UPS output neutral may not be required when the UPS is providing power to the load from the input source. However, if the UPS input source is removed due to, for example, a loss of the utility power, the inverter may be powered from an ungrounded battery source. This may allow the UPS output to "float" with respect to earth ground.

Operation of a transformer-less UPS with an ungrounded output may be undesirable. NEC non-compliance questions and complaints may produce a level of uncertainty for the customer or system designer. When the transformer-less UPS is operating in an on-battery mode, the ungrounded output may not trip downstream over-current protection devices in response to output phase-to-ground faults, which may cause some unwanted system conflicts. For example, if the fault remains after power is restored, downstream breakers may trip, seemingly without warning. An ungrounded output may also give rise to concerns about overvoltage conditions, as it raises the possibility that the output three phase voltage space may shift or move away from ground to levels that may challenge downstream components that are not rated for such voltages. These concerns are generally not associated with transformer-based UPSs, so customers and/or consultants may be hesitant to use transformer-less UPSs.

An approach for avoiding this issue with a transformer-less UPS is to run a neutral conductor from the input source to the inverter neutral point of the transformer-less UPS, thus making the UPS output a grounded system whether on-line or on-battery. This solution may provide acceptable results under most operating conditions but may entail a heavy installation expense associated with running the extra neutral conductor over a relatively long distance.

SUMMARY

Some embodiments of the inventive subject matter provide a UPS system including an inverter circuit having an input coupled to a DC link and an output configured to be coupled to a load. The system further includes a gang switch configured to couple and decouple the DC link to and from a DC power source and to couple and decouple a neutral point of the inverter circuit to and from a ground node. The gang switch may be configured to couple the neutral point to the ground node when the DC link is coupled to the DC power source and to decouple the neutral point from the ground node when the DC link is decoupled from the DC power source.

In some embodiments, the gang switch may include a contactor having a first set of contacts configured to couple and decouple the DC link to and from the DC power source first and a second set of contacts configured to couple and decouple the neutral point to and from the ground node. The second set of contacts may be configured to couple the neutral point to the ground node via a resistor. The second set of contacts may be configured to couple the neutral point to the ground node via a circuit protection device.

Further embodiments provide a UPS system including a rectifier circuit having an input configured to be coupled to an AC power source, a DC link coupled to an output of the rectifier circuit and an inverter circuit having an input coupled to the DC link and an output configured to be coupled to an external load. The system further includes a contactor configured to couple a neutral point of the inverter circuit to a local ground when the DC link is coupled to a DC power source and to decouple the neutral point from the local ground when the DC link is decoupled from the DC power source.

In some embodiments, the contactor may include a first set of contacts configured to couple and decouple the DC link to and from the DC power source and a second set of contacts configured to couple and decouple the neutral point to and from the local ground. In some embodiments, the second set of contacts may be configured to couple the neutral point to the ground node via a resistor. In some embodiments, the second set of contacts may be configured to couple the neutral point of the inverter to the ground node via a circuit protection device.

In still further embodiments, a UPS system includes first and second UPS units coupled in common to an AC power source, a DC power source and a load. At least one of the first and second UPS units is configured to couple a neutral point thereof to a local ground when the first and second UPS units are transferring power from the DC power source to the load and to decouple the neutral point from the local ground when the first and second UPS units are transferring power from the AC source to the load.

The first and second UPS units may include DC links connected in common. The first UPS unit may be configured to couple the neutral point to the local ground when the first and second UPS units transfer power from the DC power source to the load and to decouple its DC link from the DC source when the first and second UPS units transfer power from the AC source to the load. The second UPS unit may be configured to couple its DC link to the DC source when the first and second UPS units transfer power from the AC source to the load. The second UPS unit may be configured to charge the DC power source when the when the first and second UPS units are transferring power from the AC source to the load.

The first UPS unit may include a rectifier circuit having an input configured to be coupled to an AC power source, a DC link coupled to an output of the rectifier circuit, an inverter circuit having an input coupled to the DC link and an output configured to be coupled to an external load and a contactor configured to couple a neutral point of the inverter circuit to a local ground when the DC link is coupled to a DC power source and to decouple the neutral point from the local ground when the DC link is decoupled from the DC power source. The contactor may include a first set of contacts configured to couple and decouple the DC link to and from the DC power source and a second set of contacts configured to couple and decouple the neutral point of the inverter circuit to and from the local ground. The second set of contacts may be configured to couple the neutral point of the inverter circuit to the ground node via the resistor. The second set of contacts may be configured to couple the neutral point of the inverter circuit to the ground node via the circuit protection device. The first and second UPS units may be coupled to the load without using output isolation transformers.

DETAILED DESCRIPTION

Figure 1:
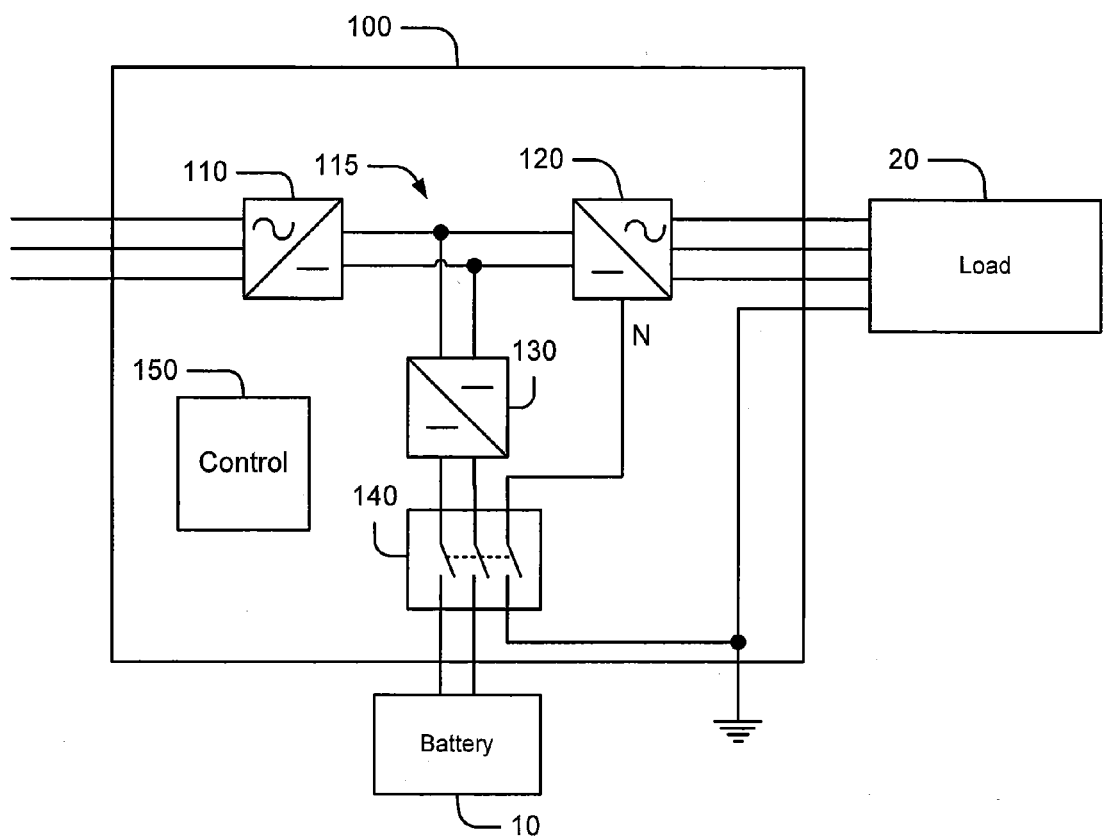
FIGS. 1-4 are schematic diagrams illustrating UPS systems according to various embodiments of the inventive subject matter.

Specific exemplary embodiments of the inventive subject matter now will be described with reference to the accompanying drawings. This inventive subject matter may, however, be embodied in many different forms and should not be construed as limited to the embodiments set forth herein rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

FIG. 1 illustrates a UPS system 100 according to some embodiments of the inventive subject matter. The UPS system 100 includes a rectifier circuit 110 and an inverter circuit 120 coupled by a DC link 115. The rectifier circuit 110 is configured to be coupled to an AC power source, such as a utility mains. The inverter circuit 120 is configured to be coupled to a load 20 using a 3-wire connection. As shown, an additional grounding conductor may be passed from the load 20 to a local ground of the UPS system 100. The UPS system 100 further includes a DC/DC converter circuit 130, which is configured to interface a battery 10 to the DC link 115 to provide auxiliary power in the event of a failure of the AC power source coupled to the rectifier circuit 110. The system 100 also includes a gang switch 140, which is configured to couple and decouple the battery 10 to and from the DC/DC converter circuit 130. A control circuit 150 controls the rectifier circuit 110, the inverter circuit 120, the DC/DC converter circuit 130 and the gang switch 140.

According to some embodiments, the gang switch 140 is also configured to couple and decouple a neutral point N of the inverter circuit 120 to and from the local ground of the UPS system 100 in synchronism with the connection of the battery 10 to the DC/DC converter circuit 130. Generally, the neutral point N is node that defines or otherwise provides a neutral reference for the phase voltages produced by the inverter circuit 120. In some embodiments, for example, the neutral point N may be provided by a common connection of output capacitors for the phase outputs of the inverter circuit 120, with this neutral connection point providing a reference for regulation of the phase voltages. In some embodiments, the neutral point may be a "synthetic" or other neutral reference that serves a similar phase voltage reference function. Synthetic and other neutral references are discussed, for example, in U.S. Pat. No. 7,088,601 to Tracy et al., incorporated herein by reference in its entirety.

The gang switch 140 is configured such that, when the battery 10 is connected to the DC/DC converter circuit 130, the inverter neutral point N is connected to a local ground. When the battery 10 is disconnected from the DC/DC converter circuit 130, the inverter neutral point N is decoupled from the local ground. In this manner, when the UPS system 100 is operating in a battery powered mode in which the output of the UPS could potentially float, the phase outputs of the inverter circuit 120 are referenced to the local ground at the UPS system 100 to prevent the phase outputs of the inverter circuit 120 from floating with respect to ground. When the UPS system 100 is operating in a normal mode, receiving power from the AC source coupled to the rectifier circuit 110, this connection to the local ground is broken, as the phase outputs of the inverter circuit 120 are referenced to ground by the connection to the AC source via the inverter circuit 120 and the rectifier circuit 110.

Figure 2:
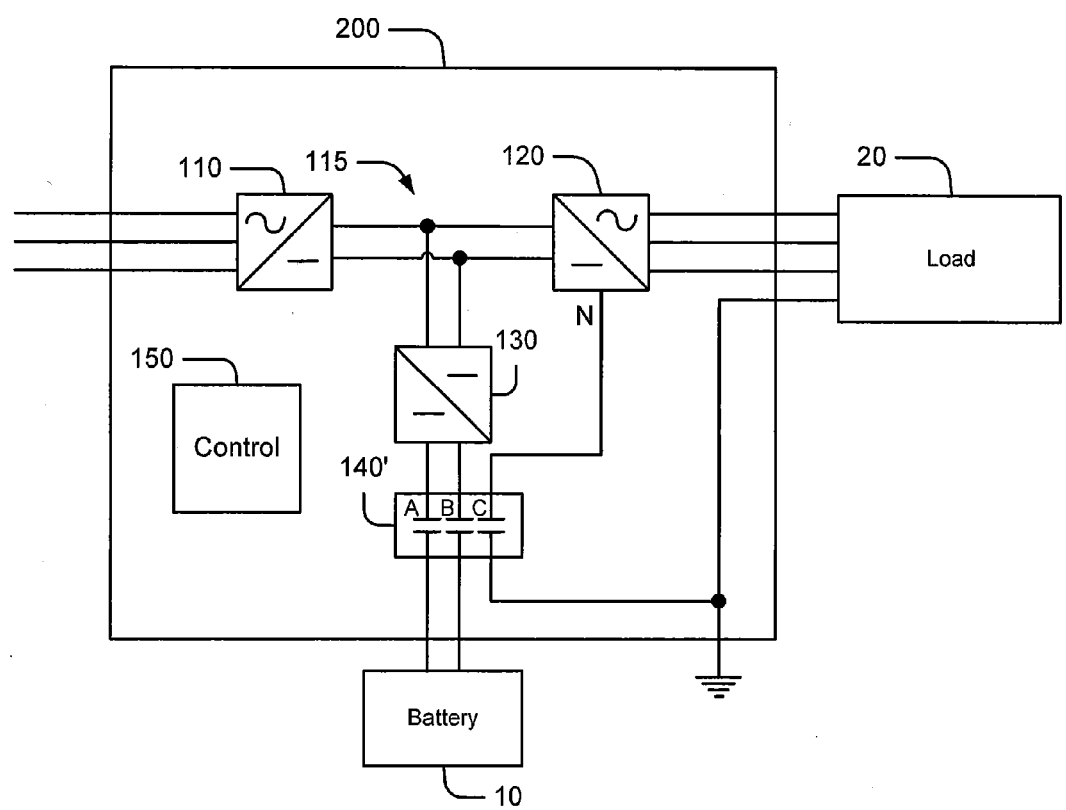

Referring to FIG. 2, according to some embodiments, a grounding arrangement along the lines illustrated in FIG. 1 may be implemented using a contactor 140' that includes three sets of contacts A, B, C. First and second sets of contacts A, B are used to connect the battery 10 to the DC/DC converter circuit 130, while a third set of contacts C is used to provide the selective local ground connection of the inverter neutral point N. This arrangement can be particularly advantageous by because of relative simplicity and robustness of control. In particular, the control circuit 150 need not separately control the battery and ground connections, as the ganged action of the contactor 140' ensures that the battery and ground connections occur in a coordinated manner. Thus, there is no need, for example, for separate electronic signaling to control a separate neutral point to ground connection circuit. Although this arrangement may preclude charging of the battery 10 via the DC/DC converter circuit 130 while the UPS system 100 is powered by the AC source, a separate charger may be provided to charge the battery 10.

Figure 3:
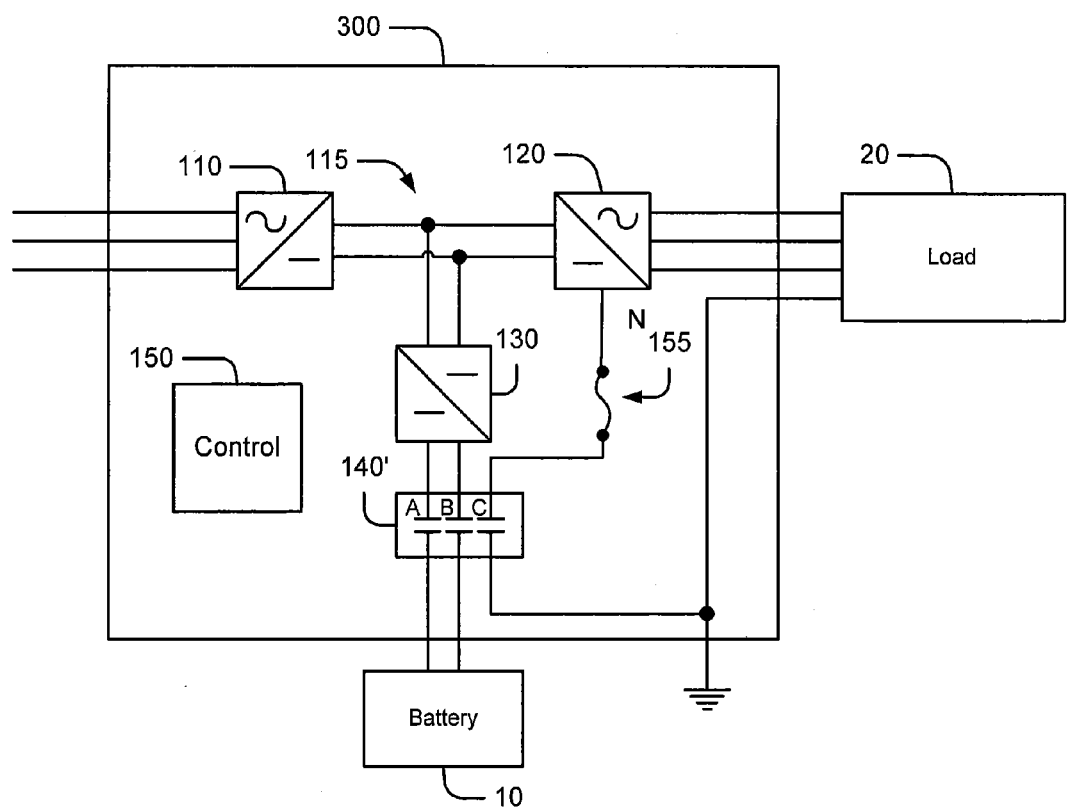
Figure 4:
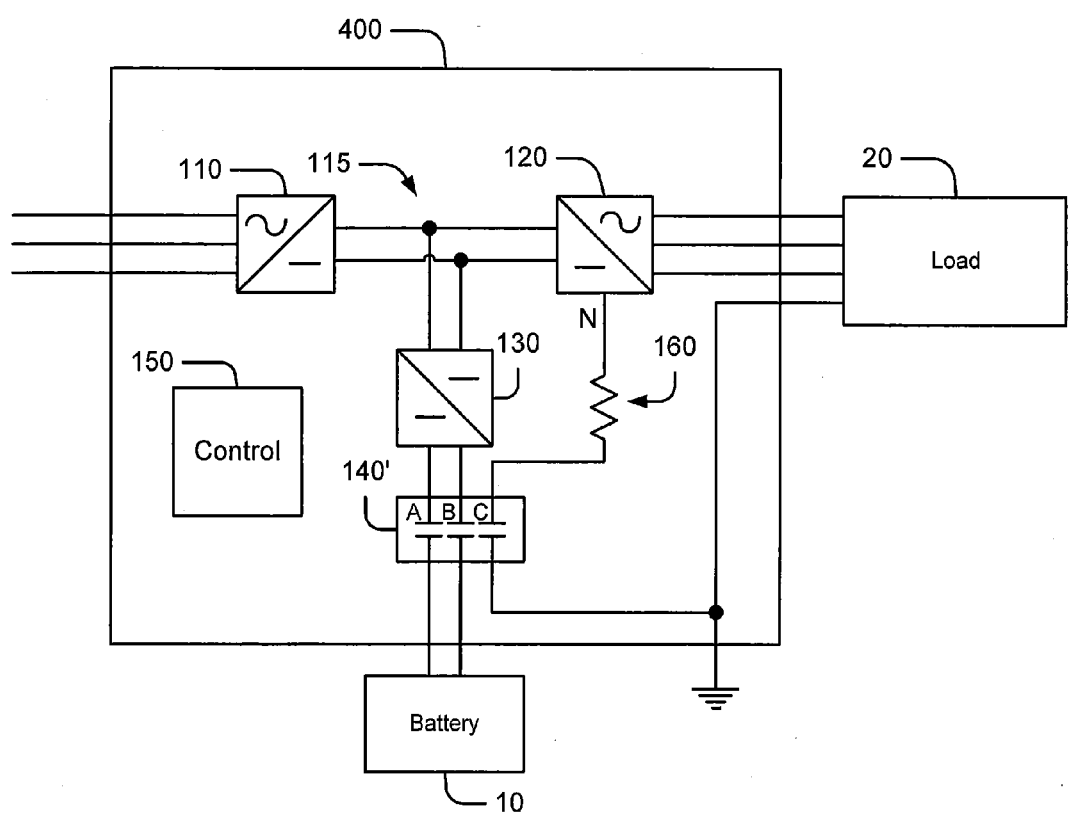

As illustrated in FIG. 3, a circuit protection device, such as a fuse 155, may be coupled in series with the contactor 140' to protect the set of ground connection contacts C in the event, for example, of a high-current fault. As illustrated in FIG. 4, fault protection may also be provided with a resistive grounding scheme implemented using the contactor arrangement of FIG. 2 with a resistor 160 coupled in series with the ground connection contacts C.

Figure 5:
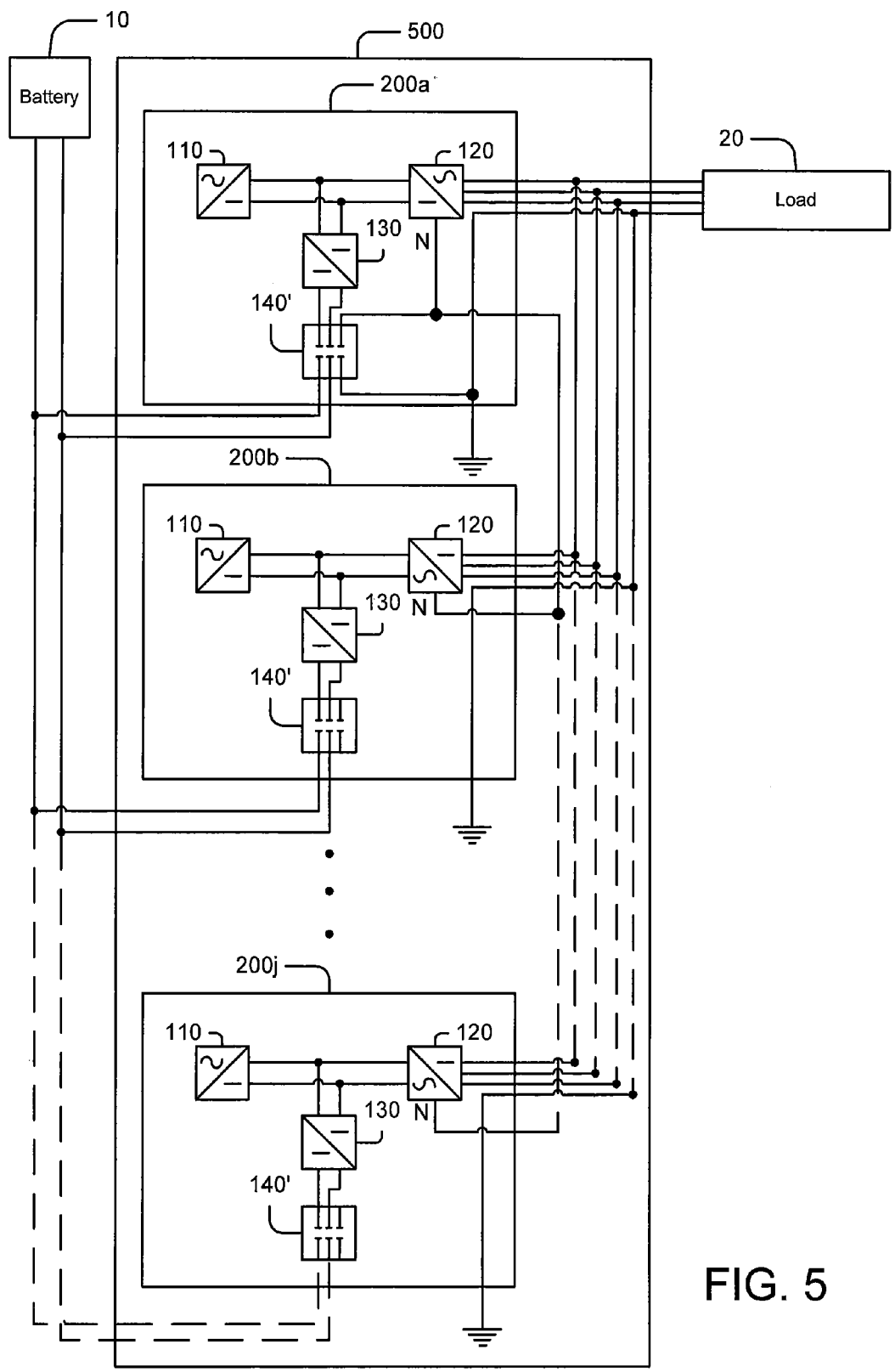
FIG. 5 is a schematic diagram illustrating a modular UPS system according to further embodiments of the inventive subject matter.

Mode-dependent selective neutral point grounding arrangements along the lines discussed above may be advantageously used in UPS applications that use multiple UPS converter units or modules that are coupled in parallel. Referring to FIG. 5, a UPS system 500 may includes a plurality of UPS modules 200a, 200b, ..., 200j, which are connected in parallel to a battery 10 and a load 20. Each UPS module 200a, 200b, ..., 200j includes a rectifier circuit 110, an inverter circuit 120, a DC/DC converter circuit 130 and a contactor 140' as discussed above. Inverter neutral points N of the paralleled UPS modules 200a, 200b, ..., 200j are connected in common. At least one UPS module 200a is configured to provide a local ground connection for the inverter neutral points N via its contactor 140', while other UPS modules of the plurality of UPS modules 200a, 200b, ..., 200j are not so configured.

Using this arrangement, the local grounding UPS module 200a may be used to provide the selective neutral point grounding described above, while the UPS modules without such local neutral point grounding may be used to charge the battery 10 via their DC/DC converter circuits 130, thus obviating the need for an additional battery charger. For example, when the system 500 is operating in an on-line mode in which power is being transferred from the input AC source via the rectifier circuits 110 and the inverter circuit 120, the contact 140' of the neutral point grounding UPS unit 200a may be held open, preventing connection of the neutral points N to the local ground, while the contactors 140' of the other UPS units 200b, ..., 200j may be closed, allowing charging of the battery 10 from the DC links of the UPS units 200b, ..., 200j. When the UPS system 500 transitions to battery power, the contactor 140' of the neutral point grounding UPS unit 200a may be closed, allowing all of the UPS units 200a, 200b, ..., 200j to transfer power from the battery 10 to the load 20 while connecting the neutral points N to the local ground.

The neutral point grounding employed by the local grounding UPS 200a may be resistive and/or fused along the lines discussed above with reference to FIGS. 3 and 4. It will also be appreciated that various embodiments may provide differing numbers of units or modules that provide local neutral point grounding and units or modules without such grounding.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. A UPS system comprising:
   an inverter circuit having an input coupled to a DC link and an output configured to be coupled to a load and
   a gang switch configured to couple and decouple the DC link to and from a DC power source and to couple and decouple a neutral point of the inverter circuit to and from a ground node.

2. The system of claim 1, wherein the gang switch is configured to couple the neutral point to the ground node when the DC link is coupled to the DC power source and to decouple the neutral point from the ground node when the DC link is decoupled from the DC power source.

3. The system of claim 1, wherein the gang switch comprises a contactor having a first set of contacts configured to couple and decouple the DC link to and from the DC power source and a second set of contacts configured to couple and decouple the neutral point to and from the ground node.

4. The system of claim 3, further comprising a resistor and wherein the second set of contacts is configured to couple the neutral point to the ground node via the resistor.

5. The system of claim 3, further comprising a circuit protection device and wherein the second set of contacts is configured to couple the neutral point to the ground node via the circuit protection device.

6. The system of claim 1, further comprising a resistor and wherein the gang switch is configured to couple the neutral point to the ground node via the resistor.

7. A UPS system comprising:
   a rectifier circuit having an input configured to be coupled to an AC power source;
   a DC link coupled to an output of the rectifier circuit;
   an inverter circuit having an input coupled to the DC link and an output configured to be coupled to an external load; and
   a contactor configured to couple a neutral point of the inverter circuit to a local ground when the DC link is coupled to a DC power source and to decouple the neutral point from the local ground when the DC link is decoupled from the DC power source.

8. The system of claim 7, wherein the contactor comprises a first set of contacts configured to couple and decouple the DC link to and from the DC power source and a second set of contacts configured to couple and decouple the neutral point to and from the local ground.

9. The system of claim 8, further comprising a resistor and wherein the second set of contacts is configured to couple the neutral point to the ground node via the resistor.

10. The system of claim 8, further comprising a circuit protection device and wherein the second set of contacts is configured to couple the neutral point of the inverter to the ground node via the circuit protection device.

11. A UPS system comprising:
first and second UPS units coupled in common to a AC power source, a DC power source and a load, wherein at least one of the first and second UPS units is configured to couple a neutral point thereof to a local ground when the first and second UPS units are transferring power from the DC power source to the load and to decouple the neutral point from the local ground when the first and second UPS units are transferring power from the AC source to the load.

12. The system of claim 11, wherein the first and second UPS units include DC links connected in common, wherein the first UPS unit is configured to couple the neutral point to the local ground when the first and second UPS units transfer power from the DC power source to the load and to decouple its DC link from the DC source when the first and second UPS units transfer power from the AC source to the load, and wherein the second UPS unit is configured to couple its DC link to the DC source when the first and second UPS units transfer power from the AC source to the load.

13. The system of claim 12, wherein the second UPS unit is configured to charge the DC power source when the when the first and second UPS units are transferring power from the AC source to the load.

14. The system of claim 12, wherein the first UPS unit comprises:
a rectifier circuit having an input configured to be coupled to an AC power source
a DC link coupled to an output of the rectifier circuit
an inverter circuit having an input coupled to the DC link and an output configured to be coupled to an external load and
a contactor configured to couple a neutral point of the inverter circuit to a local ground when the DC link is coupled to a DC power source and to decouple the neutral point from the local ground when the DC link is decoupled from the DC power source.

15. The system of claim 14, wherein the contactor comprises a first set of contacts configured to couple and decouple the DC link to and from the DC power source and a second set of contacts configured to couple and decouple the neutral point of the inverter circuit to and from the local ground.

16. The system of claim 15, further comprising a resistor and wherein the second set of contacts is configured to couple the neutral point of the inverter circuit to the ground node via the resistor.

17. The system of claim 15, further comprising a circuit protection device and wherein the second set of contacts is configured to couple the neutral point of the inverter circuit to the ground node via the circuit protection device.

18. The system of claim 15, wherein the first and second UPS units are coupled to the load without using output isolation transformers.

* * * * *